United States Patent [19]

Bohman

[11] 4,433,528
[45] Feb. 28, 1984

[54] METAL DETECTOR APPARATUS

[75] Inventor: Carl E. Bohman, New Holland, Pa.

[73] Assignee: Sperry Corporation, New Holland, Pa.

[21] Appl. No.: 413,113

[22] Filed: Aug. 30, 1982

[51] Int. Cl.³ ............................................. A01D 75/18
[52] U.S. Cl. .............................. 56/10.2; 56/DIG. 15; 340/684
[58] Field of Search ............... 56/10.2, DIG. 15; 340/684, 551; 324/232, 228; 335/207, 306; 209/223 R

[56] References Cited

U.S. PATENT DOCUMENTS

| | | | |
|---|---|---|---|
| 3,757,501 | 9/1973 | Bennett, Jr. et al. | 56/10.2 |
| 3,758,849 | 9/1973 | Susman et al. | 324/243 |
| 3,763,424 | 10/1973 | Bennett, Jr. et al. | 324/243 |
| 3,889,249 | 6/1975 | Bennett, Jr. et al. | 340/258 R |
| 3,896,608 | 7/1975 | Garrott | 56/10.2 |
| 3,959,953 | 6/1976 | Garrott | 56/10.2 |
| 3,964,042 | 6/1976 | Garrott | 340/258 R |
| 3,972,156 | 8/1976 | Bennett, Jr. et al. | 56/10.2 |
| 4,344,074 | 8/1982 | Strosser et al. | 56/10.2 |

*Primary Examiner*—Gene Mancene
*Assistant Examiner*—David I. Tarnoff
*Attorney, Agent, or Firm*—Frank A. Seemar

[57] ABSTRACT

Disclosed is metal detector apparatus for protecting the crop processing unit of a forage harvester. A magnetic field is provided in the area through which crop material is being fed. The field is produced by magnets mounted in a pattern that creates lines of flux at an angle to the general direction of movement of material. A unique pick-up coil arrangement with windings in the magnetic field provides induced signals responsive to the presence of metal objects in the field.

6 Claims, 9 Drawing Figures

U.S. Patent   Feb. 28, 1984   Sheet 1 of 2   4,433,528
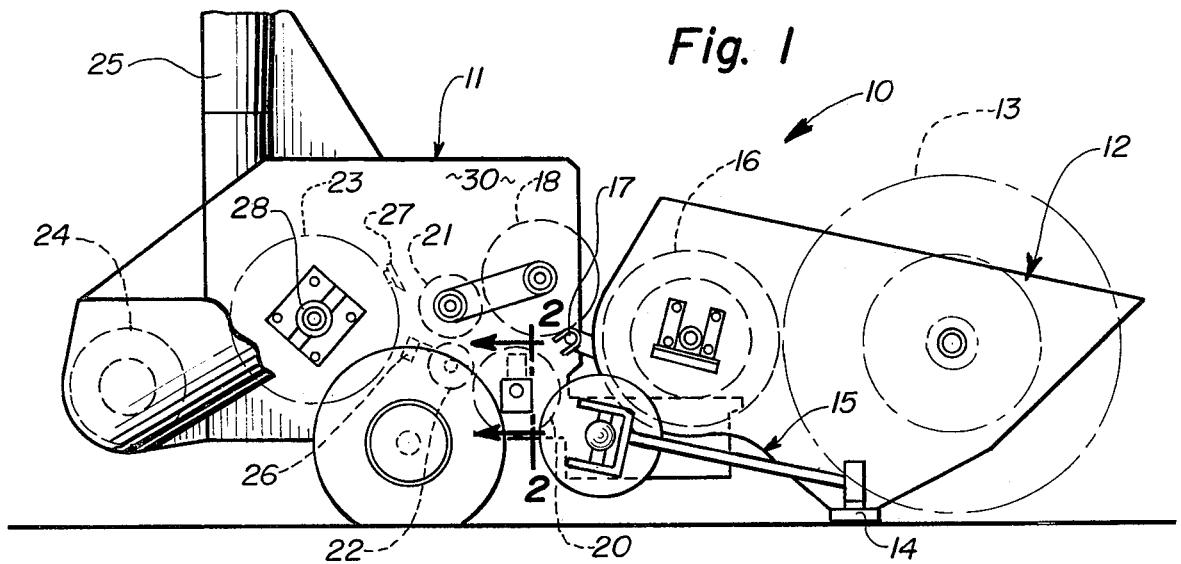
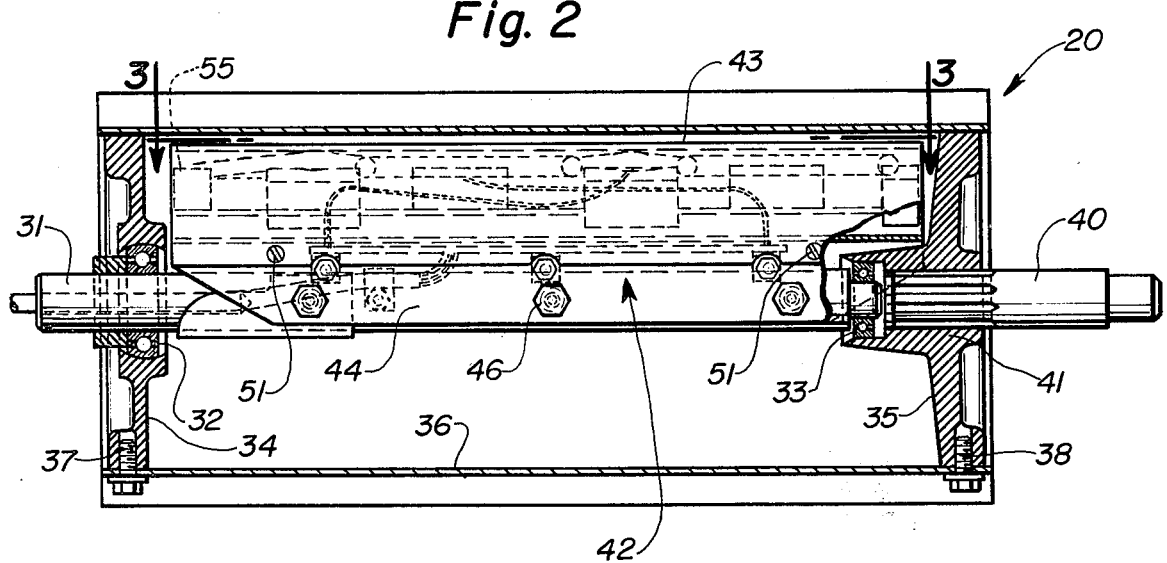
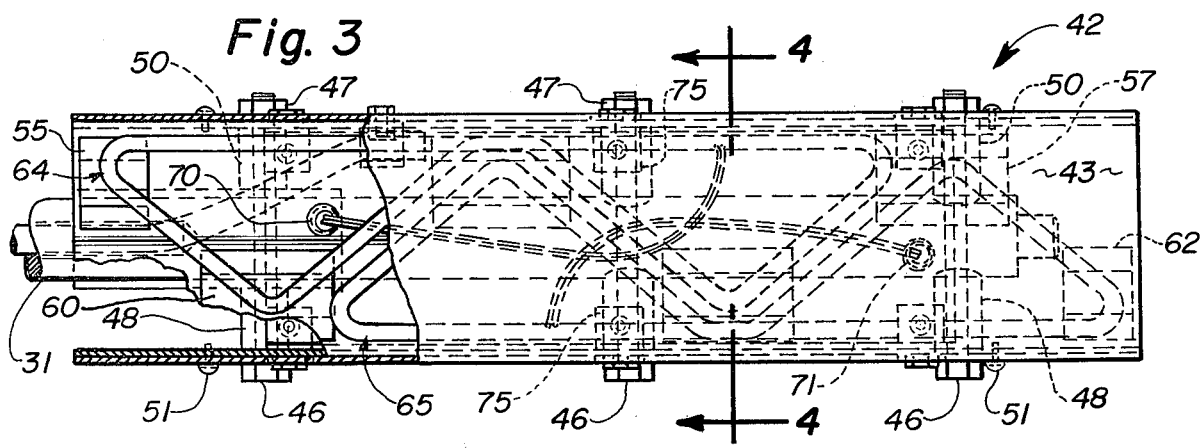

METAL DETECTOR APPARATUS

BACKGROUND OF THE INVENTION

The present invention relates to a system for detecting the presence of metal in crop material being fed to a forage harvester processing unit and, more particularly, to improved detection apparatus of the type having a magnetic field through which the crop material passes and pickup coils for sensing the presence of metal in the field.

It is not uncommon for objects, such as stones and pieces of wood, plastic or metal, to lie in the path of harvesting machines which cut or pick-up crop material. These objects can cause serious damage to the crop processing means within the machines. Harvesting machines of particular concern are forage harvesters which include crop processing means comprising a rotating cutterhead having a plurality of knives mounted for cooperative relationship with a stationary shearbar.

These high precision crop processing mechanisms require close clearances between the stationary and rotating cutting elements and are usually disposed within the body of the machine whereby access for adjustments, repair and general maintenance is somewhat difficult. The cutterhead normally rotates at a high rate of speed giving rise to the possibility of severe damage caused by foreign objects that are permitted to reach the cutting area. Pieces of wood are not generally a serious hazard nor are stones which generally splinter causing only minor damage to the cutting elements. Plastics and non-ferrous metals are rare, and in any event, relatively soft and hence not hazardous. Thus, the main risk arises from relatively hard ferrous metal objects.

Metallic objects may be whole or broken components that have become detached from machines, tools lost or left lying in a field, discarded hitch pins, fence stakes, scrap dumped by intruders, etc. Additionally, even metal objects of a relatively small size that pass through processing units without causing damage to the cutting means can ultimately poison livestock and, therefore, also present a risk. Thus metallic objects in general, regardless of size, are undesirable and, if possible, should be detected and removed from crop material being fed to the processing unit of a forage harvester to avoid damage to the machine or ultimate loss of livestock that consume the crop material.

Efforts have been made to overcome problems of this nature and the solutions have resulted in devices that have met with varying success. Of the systems known to Applicants, the most successful is the forage harvester metal detector apparatus shown in U.S. Pat. No. 3,959,953 issued to W. L. Garrott, June 1, 1976, and assigned to the assignee of the present invention. Garrott provided for metal detection in the vicinity of the feed rolls and, more particularly contemplated metal detector apparatus mounted within the lower front feed roll of a forage harvester.

Over the years, efforts have been made to continually improve various aspects of commercialized forage harvester metal detectors. Of particular concern has been the desire to provide a system exhibiting reliable detection characteristics. Exemplary of these efforts is the crossed detector coil configuration shown in U.S. Pat. Nos. 3,889,249 to Bennett et al, issued June 10, 1975, and also assigned to the assignee of the present invention. This arrangement has provided for self cancellaton of spurious background signals and thereby improved effectiveness of the system by reducing the number of false detections.

Also of concern during efforts to improve commercialized metal detector apparatus on forage harvesters has been the desire to reduce the likelihood of metal objects passing through the detection area without being sensed. To this end, reference is made to U.S. Pat. No. 4,344,074, Strosser et al issued on Aug. 10, 1982, and also assigned to the assignee of the present invention, which contemplates a system that reduces the possibility of metal passing undetected through the magnetic field.

Thus, as illustrated by the exemplary prior art the need in commercialized forage harvester metal detector apparatus for both avoiding false detections and reducing the number of undetected targets has been recognized. Present day apparatus has enjoyed continuing success but the need for improvements in the reliability and sensitivity to further optimize performance is, of course, always undesirable.

SUMMARY OF THE INVENTION

It is, accordingly, the principal object of the present invention to provide apparatus exhibiting further improvements to the detection characteristics of metal detectors adapted for use in forage harvesters. More particularly, an object is to provide metal detector apparatus of the type having a magnetic field through which crop material passes wherein the pickup coil configuration is adapted to improve sensitivity to metal in the field regardless of the shape, position, velocity and orientation of such metal.

In pursuance of these and other objects, the present invention contemplates a metal detector for protecting rotatable machine elements in harvesting machines and includes means for generating a magnetic field in the path through which material is fed. The lines of flux in the field exist in a series of regions wherein the lines in adjacent regions are not parallel. The field is generated by a configuration of magnets comprising two sets of magnet members with opposite polarity, one set being arranged in a first row and another set being arranged in a second row with the rows being generally transverse to the path of material flow and the magnet members in the first row being in a staggered relationship with respect to the magnet members in the second row. A sensing arrangement is disposed in the magnetic field for inducing an electrical signal when the magnetic field is altered by the presence of metallic material. The sensing arrangement comprises at least one coil having a plurality of windings arranged in the area of the strongest flux density whereby an interruption of the field caused by the presence of metal causes the maximum amount of changes.

The foregoing and other objects, features and advantages of the invention will appear more fully hereinafter from a consideration of the detailed description which follows, in conjunction with the accompanying sheets of drawings wherein one principal embodiment of the invention is illustrated by way of example, It is to be expressly understood, however, that the drawings are for illustrative purposes and are not to be construed as defining the limits of the invention.

BRIEF DESCRIPTION OF THE DRAWINGS

FIG. 1 is a fragmentary elevation view of a forage harvesting machine illustrating one application of the invention.

FIG. 2 is a fragmentary elevation view taken along lines 2—2 of FIG. 1.

FIG. 3 is a fragmentary plan view taken along lines 3—3 of FIG. 2.

DETAILED DESCRIPTION OF THE PREFERRED EMBODIMENT

Figure 4:
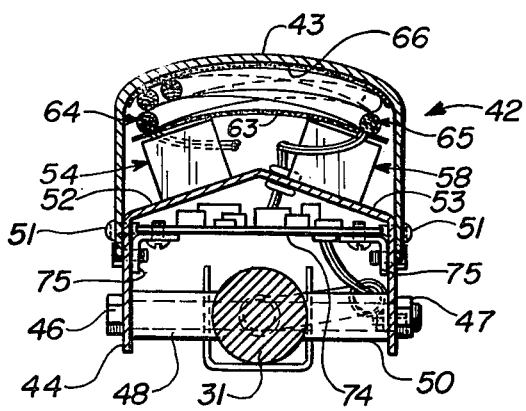
FIG. 4 is a sectional elevational view taken along lines 4—4 of FIG. 3.

Referring now to the drawings for a more detailed description, and particularly to FIG. 1, there is shown a fragmentary side elevation of a forage harvester unit of the type in which it is common to employ the invention of the present invention. The forage harvester, generally designated by reference numeral 10 comprises a base unit 11 and an attachment 12 for gathering crop material and feeding it to the base unit for processing. Attachment 12 directly cuts crop material in the field and feeds it to base unit 11 where it is chopped and eventually conveyed to a trailing forage wagon (not shown). A direct cut attachment is shown for exemplary purposes but in actual practice any type of attachment, e.g., a row crop unit or a windrow pickup, could be used with a base unit of the type shown insofar as the present invention is concerned.

More particularly, the attachment shown includes a reel 13, depicted in phantom, which operates in a conventional manner to guide material over a cutterbar 14, up an inclined floor 15 to a consolidating auger 16, also depicted in phantom outline. Attachment 12 is pivotally mounted to base unit 11 at 17 and is adapted to feed crop material to the space between upper and lower front feed rolls 18,20, and then on to upper and lower rear feed rolls 21,22 which in turn feed material to a cutterhead 23 (shown in phantom) which chops the crop material and guides it rearwardly to conveyor means 24 in a well known manner. The conveyor 24, commonly comprises an auger mounted transversely for feeding the chopped crop material to a blower unit which conveys it upwardly via a vertical spout 25 (partially shown) and then rearwardly to a trailing forage wagon.

The front and rear pairs of upper and lower feed rolls compress into a mat-like configuration the crop material which has been gathered by the attachment and consolidated by auger 24. The mat of material is fed rearwardly across the top surface of a shearbar 26 which is operatively associated with a series of cutting elements 27 (one of which is shown in phantom) on rotating cutterhead 23 journaled for rotation by mounting assembly 28 in sidewall 30 of base unit 11.

The present invention is directed to apparatus for detecting metal in the crop material being fed to cutterhead 23, and more particularly, it is concerned with detection means mounted in a lower front feed roll 20 for detecting metal in the compressed mat and initiating a control signal in response thereto for discontinuing transport of crop prior to introduction of the sensed metal to the area at which the shearbar 26 and cutterhead 23 cooperatively engage the crop. U.S. Pat. No. 3,959,953, referred to above, illustrates a prior art device in which the detection means is mounted in the vicinity of the lower front feed roll and, more particularly, the preferred embodiment shown in the '953 patent depicts the detection elements mounted within the feed roll.

Lower front feed roll 20, shown in detail in FIG. 2, includes a stationary shaft 31 on which the feed roll is journalled for rotation in bearing assemblies 32,33 suitably mounted in feed roll end caps 34,35. A generally tubular outer wall 36 of the feed roll is secured to end caps 34,35 by fastening means 37,38 and consists of a non-magnetic material such as stainless steel. A series of radial aggressive non-ferrous flange elements are provided for engaging and feeding the mat of crop material in the usual manner.

A splined stub drive shaft 40 is contained by a collar 41 forming an integral part of end cap 35. A metal detector assembly, generally referred to by reference numeral 42, is stationarily mounted on shaft 31 about which detector assembly feed roll 36 is rotated in close proximity by means of drive shaft 40 to which end cap 35 is attached. Appropriate clearance is provided between the inner surface of outer wall 36 and assembly 42 to permit unimpeded rotation of the roll about shaft 31.

Now referring generally to FIGS. 2, 3 and 4, metal detector assembly 42 more specifically comprises a plurality of principal elements enclosed within a cover plate 43 and a mounting plate 44 both of which have generally U-shaped cross sections. Mounting plate 44 is secured to shaft 31 by a series of bolts 46 and nuts 47 spaced by spacers 48 and 50 disposed between the inner surface of plate 44 and shaft 31. Secured to and aligned with the outer surface of mounting plate 44 is cover plate 43 by means of a series of metal screws 51.

Mounting plate 44 includes angularly arranged surfaces 52,53 upon which two sets of magnets are mounted, one set 54 comprising permanent magnet members 55,56 and 57 and the other set 58 comprising permanent magnet members 60, 61 and 62. Immediately above the magnet members is a fiberglass screen insulator 63 upon which are mounted first and second detector coils 64,65. A second fiberglass screen insulator 66 is mounted above the coils and contiguous with the inner surface of the upper wall of cover plate 43. Mounting plate 44, magnet sets 54,58, insulator 63, coils 64,65, insulator 66 and cover plate 43 are depicted in an exploded view in FIG. 5 for illustrative purposes.

Figure 5:
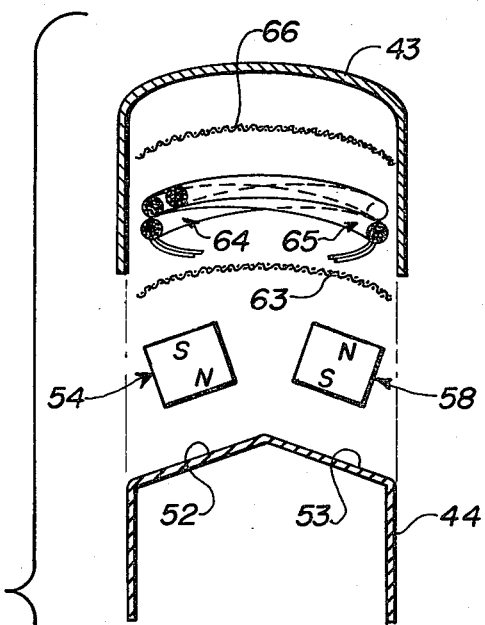
FIG. 5 is an exploded view of several of the key elements of the invention.
Figure 6:
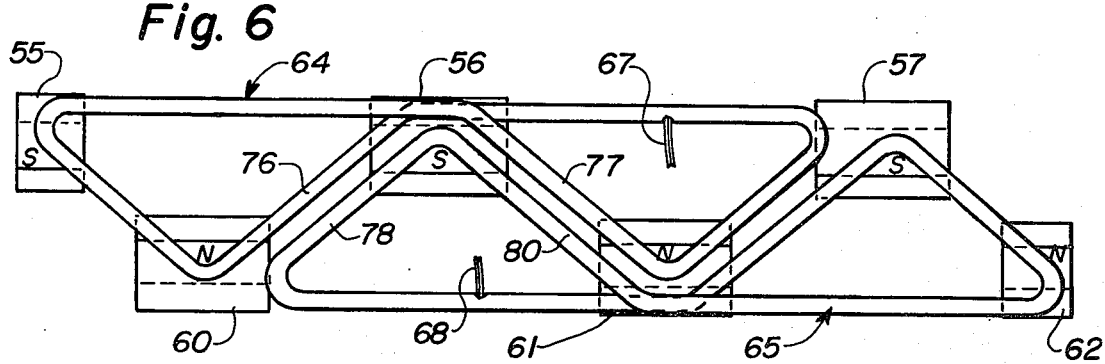
FIG. 6 is a diagrammatic plan view showing an important relationship between the magnets and the detector coils of the invention.

Detector coils 64,65, shown in FIGS. 2-5, are diagrammatically illustrated in FIG. 6. Each coil consists approximately of one thousand windings and is arranged generally in a figure eight configuration. The ends of the windings 67,68 pass through insulating grommets 70,71 (see FIG. 3) on mounting plate 44, and are connected to the input of electronic amplifiers 72,73 shown in block diagram in FIG. 9 wherein the signal processor is illustrated, the elements of which are mounted on a printed circuit board 74 (FIG. 4) which in turn is mounted via brackets 75 to mounting plate 44. It should be noted that each of the two sensor coils could consist of side-by-side triangular coils having electrical connections such that the equivalent to the figure eight configuration shown would exist.

Figure 7:
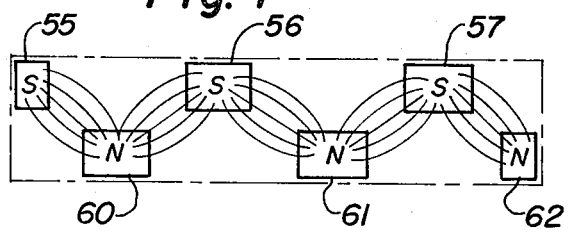
FIG. 7 is a diagrammatic plan view showing the principal magnetic lines of flux between the magnets used to create a detection field.
Figure 8:
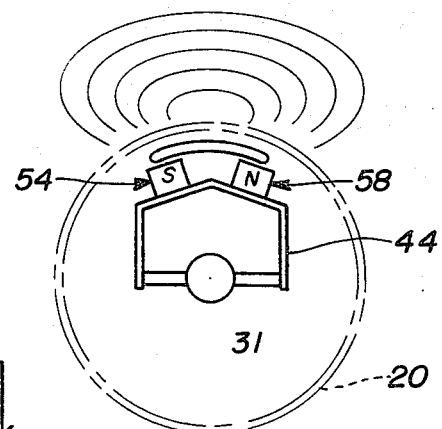
FIG. 8 is a diagrammatic elevation view showing the relationship of the detection field to the feed roll.
Figure 9:
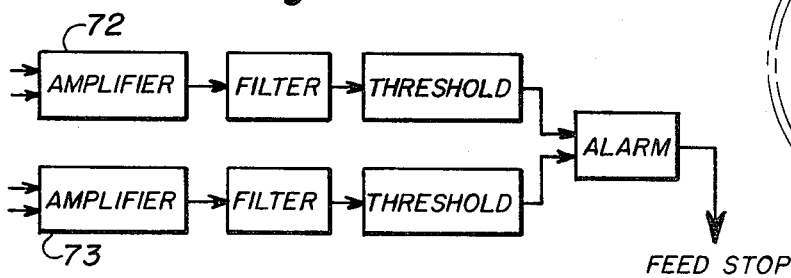
FIG. 9 is a block diagram of the electrical circuit used to process detection signals.

The magnetic field, provided by magnet sets 54,58 in its undisturbed condition has lines of flux in the configuration shown in FIGS. 7 and 9 whereby a detection field is generated having a series of regions in a zig-zag path formed by two rows of magnets transverse to the direction of travel of the crop material and the magnets in each of which rows having opposite polarity. A typical staggered magnetic field source is shown in U.S. Pat. No. 4,334,074 mentioned above, wherein a plurality of magnetic field regions are established in a manner similar to that depicted in FIG. 7.

Referring to FIGS. 2-6, permanent magnets in set 58 having north poles extending upwardly are arranged in a staggered configuration with the series of magnets arranged in set 54 having south poles facing upwardly. The lines of flux in the magnetic fields established by these magnets are shown in FIG. 7. It should be noted that based on conventional magnetic circuitry theory the concentration of flux lines between magnets of opposite polarity is most dense along a path between pole centers. These concentrations of flux lines form a detection field in which coils 64 and 65 are mounted. The field comprises regions in which the strongest flux density is a zig-zag pattern transverse to the path of travel of crop material. Thus, as shown in FIG. 5, the strongest flux regions between a first magnet member 56 and second and third magnet members 60,61, for example, have disposed therein portions 76,77 and 78,80 of the windings from coils 64 and 65, respectively, as shown in FIG. 6.

More particularly, coil 64 consists of two triangular sections both of which include two sides disposed parallel to and in the immediate vicinity of paths of flux wherein the lines are most dense. Likewise, coil 65 consists of two triangular sections both of which also have two sides disposed parallel to and in the immediate vicinity of the same paths of flux. This arrangement enables the sensing coils to be cut by a maximum amount of changing flux lines under conditions where the detection field is disturbed by a metal particle.

Of particular note is the fact that coils 64,65 each exhibit certain areas of high sensitivity and other certain areas of low sensitivity, i.e., the areas of high sensitivity are the apexes of the two triangular sections and the areas of low sensitivity is at the point of intersection of the two triangular sections. These areas of sensitivity are the same under conditions where the sensing coils consist of two side-by-side separate triangular sections, as mentioned above. An important aspect of the present invention is the offset relationship of coils 64,65 whereby areas of maximum and minimum sensitivity are exhibited by the coils at a point along the path whereby they are adjacent, i.e., a metal object passing through the field in the area where one coil is of minimal effectiveness during the same pass by passing through the area where the other coil is of maximum effectiveness.

Now turning to operation of the apparatus shown to further explain the present invention, lower front feed roll 20 cooperates with upper front feed roll 18 to feed a compressed mat of crop material to rear feed rolls 21,22 and ultimately to cutterhead 23. When the mat is in the vicinity of the upper surface of metal detector cover plate 43 it passes through a detection field established by the permanent magnets 60 through 61 and 55 through 57 as shown in FIGS. 6 and 7. Under conditions where crop material has metal objects embedded therein, the presence of such objects in the field will distort the flux lines between the sets of permanent magnets which perturbations are detected by pickup coils 64,65 thereby inducing a signal in a well known manner. The signal is processed in the circuit shown in FIG. 9, consisting of appropriate amplifier, filter and threshold circuits feeding in parallel to an alarm or control circuit employed in a fashion similar to present day known metal detector systems.

It will be appreciated from the foregoing that the present invention provides a highly effective metal detection system which is an improvement over prior art arrangements. The placement of portions of the pick-up coils along the major lines of flux provided by the magnetic field results in a system whereby a maximum amount of changes are sensed when metal exists in the field. Furthermore, the arrangement of paired pickup coils in staggered arrangements provided for a system whereby sensitivity is enhanced because even though a metallic object may enter the detection field at a null point of one of the pickup coils, the other coil is at its maximum point of effectiveness. Still further, the paired arrangement of coils permits clutter cancellation in a known manner regardless of whether individual triangular sections or a figure eight configuration is employed.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a metal detector for protecting rotatable machine elements in harvesting machines, having means for generating a magnetic field comprising flux lines in a material flow path, the flux lines of said field being in a series of regions, the lines of adjacent regions being other than parallel to each other, said generating means comprising two sets of magnet members, one set of said magnet members having a first polarity and being in a first row, another set of said magnet members of the opposite polarity being in a second row, said rows being generally tranverse to the material flow path and said magnet members of said first row being in staggered relationship with the magnet members of the second row, sensing means in which an electrical signal is induced when the magnetic field is altered by the presence of metallic material, and a signal processor to initiate a control sequence to limit damage to the said elements when the presence of undesirable material is detected, the improvement comprising, said sensing means comprising a coil having a plurality of windings, said windings having at least two generally equal portions, and means for mounting said coil such that one of said portions extends from the vicinity of a first magnet member in said one set to the vicinity of a second magnet in said another set, and the second of said portions extends from the vicinity of said first magnet to the vicinity of a third magnet in said another set.

2. A metal detector, as set forth in claim 1, wherein said coil comprises windings in a generally triangular configuration.

3. In a metal detector for protecting rotatable machine elements in harvesting machines, having means for generating a magnetic field comprising flux lines in a material flow path, the flux lines of said field being in a series of regions, the lines of adjacent regions being other than parallel to each other, said generating means comprising two sets of magnet members, one set of said magnet members having a first polarity and being in a first row, another set of said magnet members of the opposite polarity being in a second row, said rows being generally transverse to the material flow path and said magnet members of said first row being in staggered relationship with the magnet members of the second row, sensing means in which an electrical signal is induced when the magnetic field is altered by the presence of metallic material, and a signal processor to initiate a control sequence to limit damage to the said elements when the presence of undesirable metal is detected, the improvement comprising, said sensing means comprising a coil having a plurality of windings, said windings comprising first and second triangular sections and, means for mounting said coil such that said windings comprising first and second triangular sections are arranged in side-by-side fashion each with two generally equal portions extending generally parallel with and adjacent to the shortest flux paths between the magnet members in said first and second row of magnets.

4. A metal detector, as set forth in claim 3, wherein the windings of said first and second triangular sections are connected together in a manner whereby signals induced in such sections will be of opposite polarity.

5. A metal detector, as set forth in claim 3, wherein said sensing means further comprise a second coil having at least one triangular section with portions extending generally parallel with portions of said first and second triangular sections and adjacent to the shortest paths of flux between the magnet members of said first and second rows of magnets.

6. A metal detector, as set forth in claim 5, wherein said second coil includes first and second triangular sections connected together in a manner whereby signals induced in such sections will be of opposite polarity.

* * * * *